Figure 1:
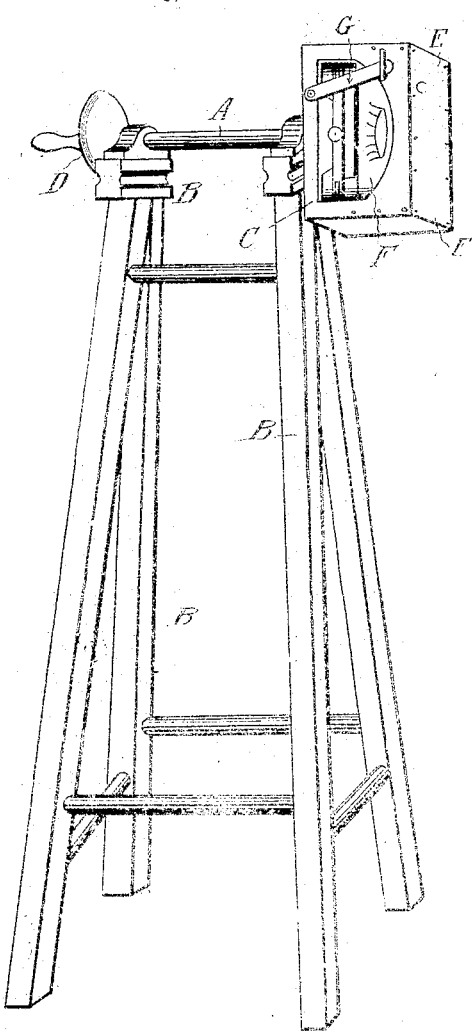

No. 686,243.  
W. ANDERSON.  
PHOTOGRAPHIC VIGNETTING APPARATUS.  
(Application filed Feb. 3, 1899. Renewed Sept. 26, 1901.)

Patented Nov. 12, 1901.

(No Model.)

2 Sheets—Sheet 1.

Witnesses:  
G. S. Noble  
J. Buehler

Inventor:  
William Anderson  
by B. Singer  
Att'y

No. 686,243. Patented Nov. 12, 1901.
W. ANDERSON.
PHOTOGRAPHIC VIGNETTING APPARATUS.
(Application filed Feb. 3, 1899. Renewed Sept. 26, 1901.)
(No Model.) 2 Sheets—Sheet 2.
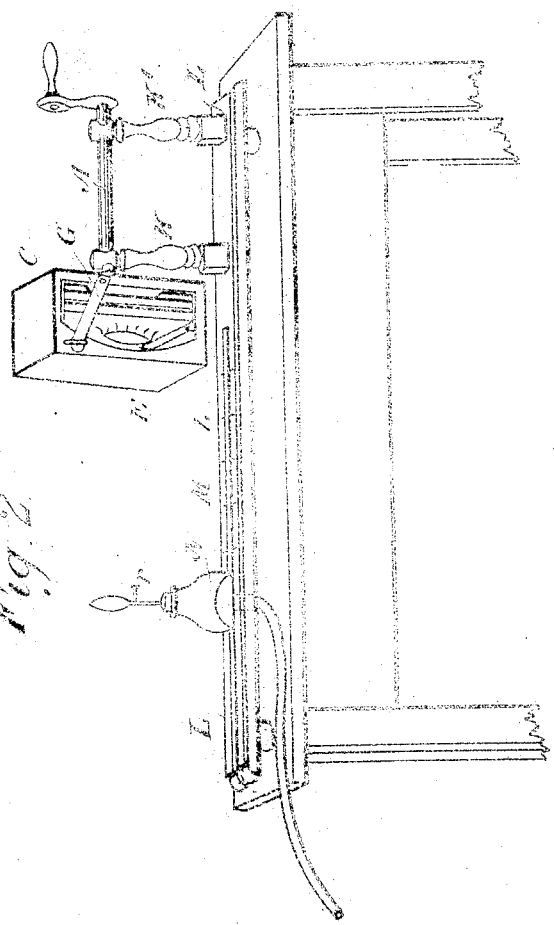
Witnesses:
G. S. Noble
J. Buchler
Inventor,
William Anderson
by B. Singer
Att'y.

United States Patent Office.

WILLIAM ANDERSON, OF PARTICK, GLASGOW, SCOTLAND.

PHOTOGRAPHIC VIGNETTING APPARATUS.

SPECIFICATION forming part of Letters Patent No. 686,243, dated November 12, 1901.

Application filed February 3, 1899. Renewed September 26, 1901. Serial No. 76,701. (No model.)

*To all whom it may concern:*

Be it known that I, WILLIAM ANDERSON, photographer, residing at 364 Hamilton Place, Partick, in the city of Glasgow, Scotland, have invented a Vignetting-Machine to Vignette Photographs, (for which I have obtained a patent in Great Britain, No. 20,243, bearing date September 24, 1898,) of which the following is a specification.

My invention has for its object to provide a simple, cheap, and efficient machine to vignette photographs.

In carrying out my invention I provide a spindle of any convenient length, which rests on a suitable standard, and fixed to the end of the spindle is a box for holding the printing-frame. This box is provided with a cover, on which tissue-paper, cheese-cloth, or fine muslin is stretched to give diffusion of light to make soft vignettes.

I have shown my invention in the accompanying drawings, in which—

Figure 1 is a perspective view of one form of my invention. Fig. 2 is a perspective view of a modified form of same.

Referring to the drawings, A is a spindle, which is suitably mounted on a standard B. To one end of the spindle is fixed the box C for holding the printing-frame, and at the opposite end thereof is secured a handle D for turning the spindle, and thereby rotating the box. The box C is rectangular in shape and provided with a removable cap or cover E, upon which is stretched tissue-paper, cheese-cloth, or fine muslin, or a combination of tissue-paper and cloth, to give the required diffusion of light. In the side of the box is an opening F, through which the printing-frame containing the negative may be inserted. Pivoted to the box at one side of the opening is a bar or latch G, which is adapted to be placed across the opening and have its free end caught in a suitable catch on the opposite side of the opening, thereby preventing the frame from falling out of the box.

The device or box is placed opposite a lamp, gas-burner, or other light and rotated by turning the handle. In Fig. 2 I have shown the spindle supported on two arms K K', which are fixed to a base-plate L, in which a longitudinal slot M is formed. In this slot a lamp N, having a regulator $n$, is slidingly secured. The surface of the base L is marked with a scale, so that the operator can without difficulty regulate the distance between the lamp and the box and ascertain same at all times. A table takes the place of the standard B in this adaptation of my invention. If a gas-jet be employed, the lamp may be connected with the source of gas-supply by a suitable flexible tube, as shown in Fig. 2.

Having thus described my invention, what I claim as new, and desire to obtain by Letters Patent, is—

1. A vignetting-machine composed of a suitably-mounted spindle, a box mounted on said spindle adapted to hold a printing-frame, and provided with a cover formed of tissue-paper and cloth, and means for securing a frame within the box, substantially as set forth.

2. A vignetting-machine composed of a suitably-mounted spindle, a box mounted on said spindle, adapted to hold a printing-frame, and provided with a cover formed of tissue-paper and cloth, means for securing a frame in the box, a lamp or the like, means for regulating the distance between the lamp and the box, substantially as set forth.

In testimony whereof I affix my signature in presence of two witnesses.

WM. ANDERSON.

Witnesses:
J. FAIRLIE,
HUGH GORDON.